(12) United States Patent
Stationwala et al.

(10) Patent No.: US 10,911,300 B2
(45) Date of Patent: Feb. 2, 2021

(54) OPTIMIZATION FOR DEVICE PROVISIONING PROTOCOL ONBOARDING IN WIRELESS NETWORKS

(71) Applicant: MediaTek Singapore Pte. Ltd., Singapore (SG)

(72) Inventors: Hasan Ali Stationwala, Noida (IN); Amit Kumar Shakya, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/553,130

(22) Filed: Aug. 27, 2019

(65) Prior Publication Data
US 2020/0169461 A1    May 28, 2020

(30) Foreign Application Priority Data

Nov. 23, 2018   (IN) .............................. 201821044154

(51) Int. Cl.
*G06F 15/177*    (2006.01)
*H04L 12/24*     (2006.01)
*H04W 12/06*     (2021.01)

(52) U.S. Cl.
CPC ........ *H04L 41/0806* (2013.01); *H04L 41/048* (2013.01); *H04L 41/0823* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2011/0004549 A1* | 1/2011 | Gray | G06Q 20/102 705/40 |
| 2016/0142416 A1* | 5/2016 | Smith | H04L 63/0853 726/9 |
| 2016/0255487 A1* | 9/2016 | Abu-Hakima | H04W 4/029 455/404.2 |
| 2017/0099604 A1* | 4/2017 | Raleigh | H04W 12/1208 |
| 2018/0184296 A1* | 6/2018 | Hunt | H04W 76/14 |
| 2018/0270049 A1* | 9/2018 | Cammarota | H04L 9/088 |
| 2018/0278625 A1* | 9/2018 | Cammarota | H04L 63/16 |
| 2018/0316646 A1* | 11/2018 | Elliott | H04L 63/02 |
| 2018/0338242 A1* | 11/2018 | Li | H04W 12/00512 |
| 2019/0332774 A1* | 10/2019 | Nix | H04L 9/0838 |

* cited by examiner

*Primary Examiner* — Phyllis A Book
(74) *Attorney, Agent, or Firm* — Han IP PLLC; Andy M. Han (57) ABSTRACT

Examples pertaining to optimization for device provisioning protocol (DPP) onboarding in wireless networks are described. An apparatus acting as a controller of a wireless network receives, from a smart device, information related to a unconfigured device as an enrollee not yet onboarded into the wireless network. The apparatus then causes a plurality of configured agents in the wireless network to participate simultaneously in attempting to onboard the unconfigured device via a DPP mechanism responsive to receiving the information related to the unconfigured device.

18 Claims, 4 Drawing Sheets

RECEIVE, BY A PROCESSOR OF AN APPARATUS ACTING AS A CONTROLLER OF A WIRELESS NETWORK, FROM A SMART DEVICE INFORMATION RELATED TO A UNCONFIGURED DEVICE AS AN ENROLLEE NOT YET ONBOARDED INTO THE WIRELESS NETWORK
310

CAUSE, BY THE PROCESSOR, A PLURALITY OF CONFIGURED AGENTS IN THE WIRELESS NETWORK TO PARTICIPATE SIMULTANEOUSLY IN ATTEMPTING TO ONBOARD THE UNCONFIGURED DEVICE VIA A DEVICE PROVISIONING PROTOCOL (DPP) MECHANISM RESPONSIVE TO RECEIVING THE INFORMATION RELATED TO THE UNCONFIGURED DEVICE
320

OPTIMIZATION FOR DEVICE PROVISIONING PROTOCOL ONBOARDING IN WIRELESS NETWORKS

CROSS REFERENCE TO RELATED PATENT APPLICATION(S)

The present disclosure is part of a non-provisional application claiming the priority benefit of India Patent Application No. 201821044154, filed on 23 Nov. 2018, the content of which being incorporated by reference in its entirety.

TECHNICAL FIELD

The present disclosure is generally related to wireless communications and, more particularly, to optimization for device provisioning protocol (DPP) onboarding in wireless networks.

BACKGROUND

Unless otherwise indicated herein, approaches described in this section are not prior art to the claims listed below and are not admitted as prior art by inclusion in this section.

In the DPP adaption of multi-access point (MAP) release 2 (MAP-R2) specification, a small device would be utilized to communicate information related to a unconfigured device, as an enrollee yet to be onboarded into a wireless network, to a controller of the wireless network. The controller typically chooses one of a plurality of configured agents in the wireless network to start sending a DPP authentication request to the enrollee and to wait for a DPP authentication response from the enrollee. If the chosen configured agent does not receive any DPP authentication response from the enrollee, the controller would choose another configured agent to start sending a DPP authentication request to the enrollee and to wait for a DPP authentication response from the enrollee. Thus, multiple configured agents would be required to send a DPP authentication request, and the controller would need to choose a controller agent in a serial manner. Accordingly, the process may likely be repeated multiple times, and the overall onboarding time for DPP could be undesirably long.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure aims to provide schemes, solutions, concepts, designs, methods and systems pertaining to optimization for DPP onboarding in wireless networks. In particular, the present disclosure aims to reduce overall onboarding time for DPP by causing a plurality of configured agents to participate in attempting to onboard a unconfigured device to onboard into a wireless network via a DPP mechanism.

In one aspect, a method may involve a processor of an apparatus, acting as a controller of a wireless network, receiving from a smart device information related to a unconfigured device as an enrollee not yet onboarded into the wireless network. The method may also involve the processor causing a plurality of configured agents in the wireless network to participate simultaneously in attempting to onboard the unconfigured device via a DPP mechanism responsive to receiving the information related to the unconfigured device.

In another aspect, a method may involve a processor of an apparatus, acting as a configured agent in a wireless network, receiving from a controller of the wireless network a request. The method may also involve the processor transmitting a DPP authentication request to a unconfigured device as an enrollee not yet onboarded into the wireless network responsive to receiving the request.

In yet another aspect, an apparatus may include a communication device and a processor coupled to the communication device. The communication device may be configured to wirelessly communicate with a plurality of configured agents in a wireless network. The processor may be configured to receive, via the communication device, from a smart device information related to a unconfigured device as an enrollee not yet onboarded into the wireless network. The processor may also be configured to cause the plurality of configured agents in the wireless network to participate simultaneously in attempting to onboard the unconfigured device via a DPP mechanism responsive to receiving the information related to the unconfigured device.

It is noteworthy that, although description provided herein may be in the context of certain radio access technologies, networks and network topologies such as Wi-Fi in accordance with the Institute of Electrical and Electronics Engineers (IEEE) 802.11 specifications, the proposed concepts, schemes and any variation(s)/derivative(s) thereof may be implemented in, for and by other types of radio access technologies, networks and network topologies such as, for example and without limitation, $5^{th}$ Generation (5G), New Radio (NR), Long-Term Evolution (LTE), LTE-Advanced, and LTE-Advanced Pro. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimization for DPP onboarding in wireless networks. According to the present disclosure, a number of possible solutions may be implemented separately or jointly. That is, although these possible solutions may be described below separately, two or more of these possible solutions may be implemented in one combination or another.

In the present disclosure, the terms "repeater" and "Wi-Fi repeater" refer to a Wi-Fi device with at least one station (STA) interface and at least one access point (AP) interface, with an IEEE 802.3-compliant bridge between the STA interface and the AP interface.

In the present disclosure, the term "DPP-based Wi-Fi repeater network" refers to a network formed by multiple Wi-Fi repeaters such that at least one of the Wi-Fi repeaters is capable of acting or otherwise functioning as a DPP configurator.

In the present disclosure, the term "smart device" refers to a device that is capable of reading QR code information present on a Wi-Fi repeater as well as connecting to a wireless AP.

In the present disclosure, the term "configured agent" refers to a device that is onboarded in a wireless network (e.g., DPP-based Wi-Fi repeater network or MAP-R2 network) using a DPP mechanism. A configured agent is capable of acting or otherwise functioning as a DPP initiator. Moreover, a configured agent can be a controller or an agent.

In the present disclosure, the terms "unconfigured device" and "enrollee" refer to a device that is not yet onboarded into the wireless network. A unconfigured device is capable of acting or otherwise functioning as a responder.

Figure 1:
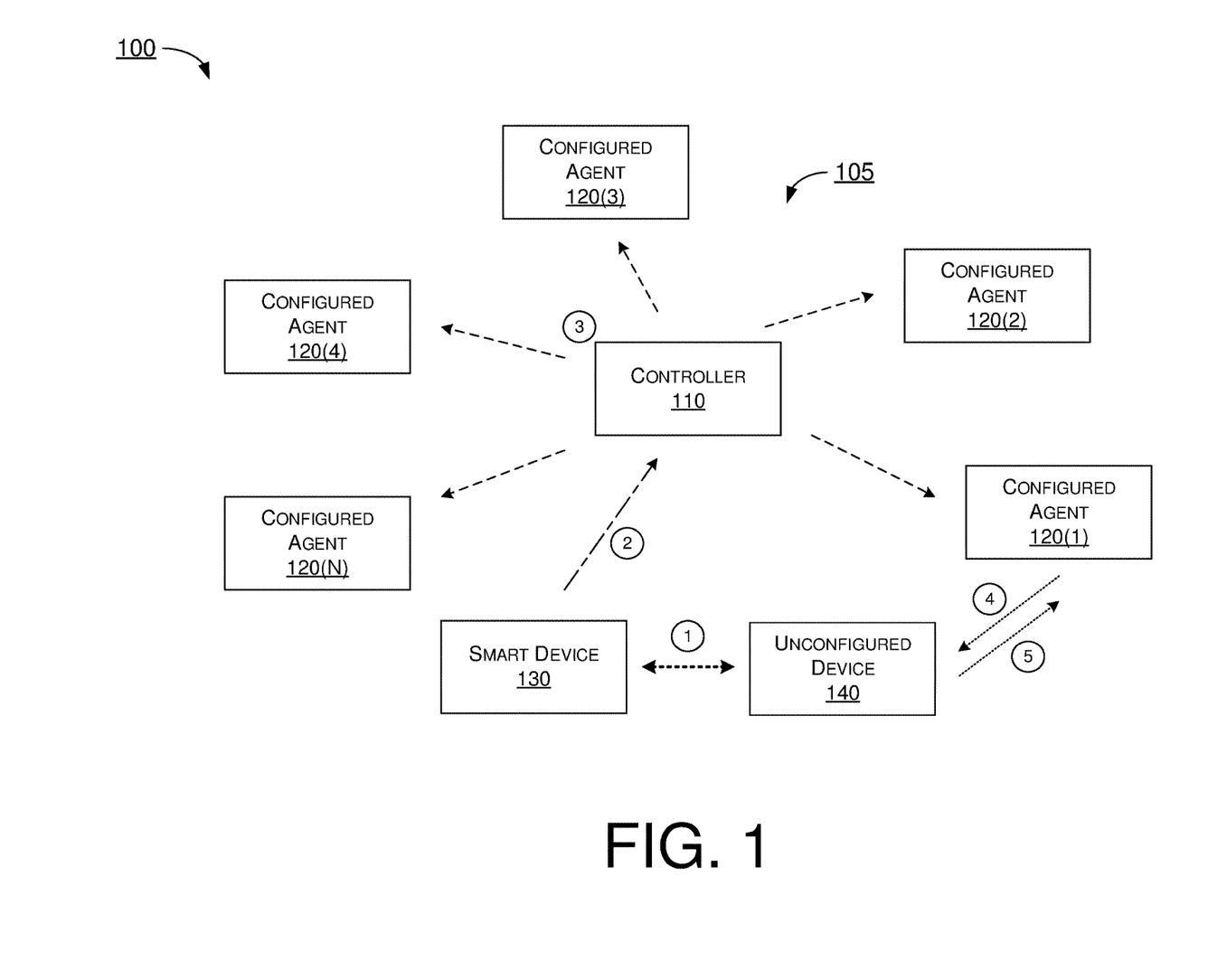
FIG. 1 is a diagram of an example scenario in which a proposed scheme in accordance with the present disclosure may be implemented.

FIG. 1 illustrates an example scenario 100 in which a proposed scheme in accordance with the present disclosure may be implemented. Scenario 100 may involve a controller 110 of a wireless network 105 (e.g., a DPP-based Wi-Fi repeater network or MAP-R2 network), a plurality of configured agents 120(1)~120(N) in the wireless network with N being a positive integer greater than 1, a smart device 130, and a unconfigured device 140 not yet onboarded into the wireless network.

In scenario 100, initially smart device 130 may obtain information related to unconfigured device 140. For instance, smart device 130 may scan a QR code on unconfigured device 140 that represents bootstrap information on credentials of unconfigured device 140. This is labeled as step (1) in FIG. 1. Then, smart device 130 may transmit the information related to unconfigured device 140 to controller 110. This is labeled as step (2) in FIG. 1.

Under a proposed scheme in accordance with the present disclosure, controller 110 may transmit a request to all the configured agents 120(1)~120(N) to cause configured agents 120(1)~120(N) to start transmitting a DPP authentication request simultaneously to unconfigured device 140. This is labeled as step (3) and step (4) in FIG. 1, respectively. For simplicity and to avoid obscuring the illustration, in FIG. 1 an arrow pointing from configured agent 120(1) to unconfigured device 140 is shown to depict the transmission of a DPP authentication request. Similarly, an arrow pointing from unconfigured device 140 to configured agent 120(1) is shown to depict the transmission of a DPP authentication response, which is labeled as step (5) in FIG. 1.

Under the proposed scheme, configured agents 120(1)~120(N) may keep attempting retries of transmission of the DPP authentication request until either of the following conditions is met: (a) one of configured agents 120(1)~120(N) receives a DPP authentication response from unconfigured device 140, and (b) controller 110 sends another request to at least one of configured agents 120(1)~120(N) to stop the retries. In an event that one of configured agents 120(1)~120(N) receives a DPP authentication response from unconfigured device 140, such configured agent may inform controller 110 which in turn may request other ones of configured agents 120(1)~120(N) to stop the retries (e.g., stop transmitting the DPP authentication request).

Accordingly, as multiple configured agents simultaneously attempt to obtain a DPP authentication response from unconfigured device 140 (e.g., by transmitting the DPP authentication request multiple times until one of the above-listed conditions is met), overall DPP onboarding time may be reduced. Advantageously, overall system performance may be improved.

Illustrative Implementations

Figure 2:
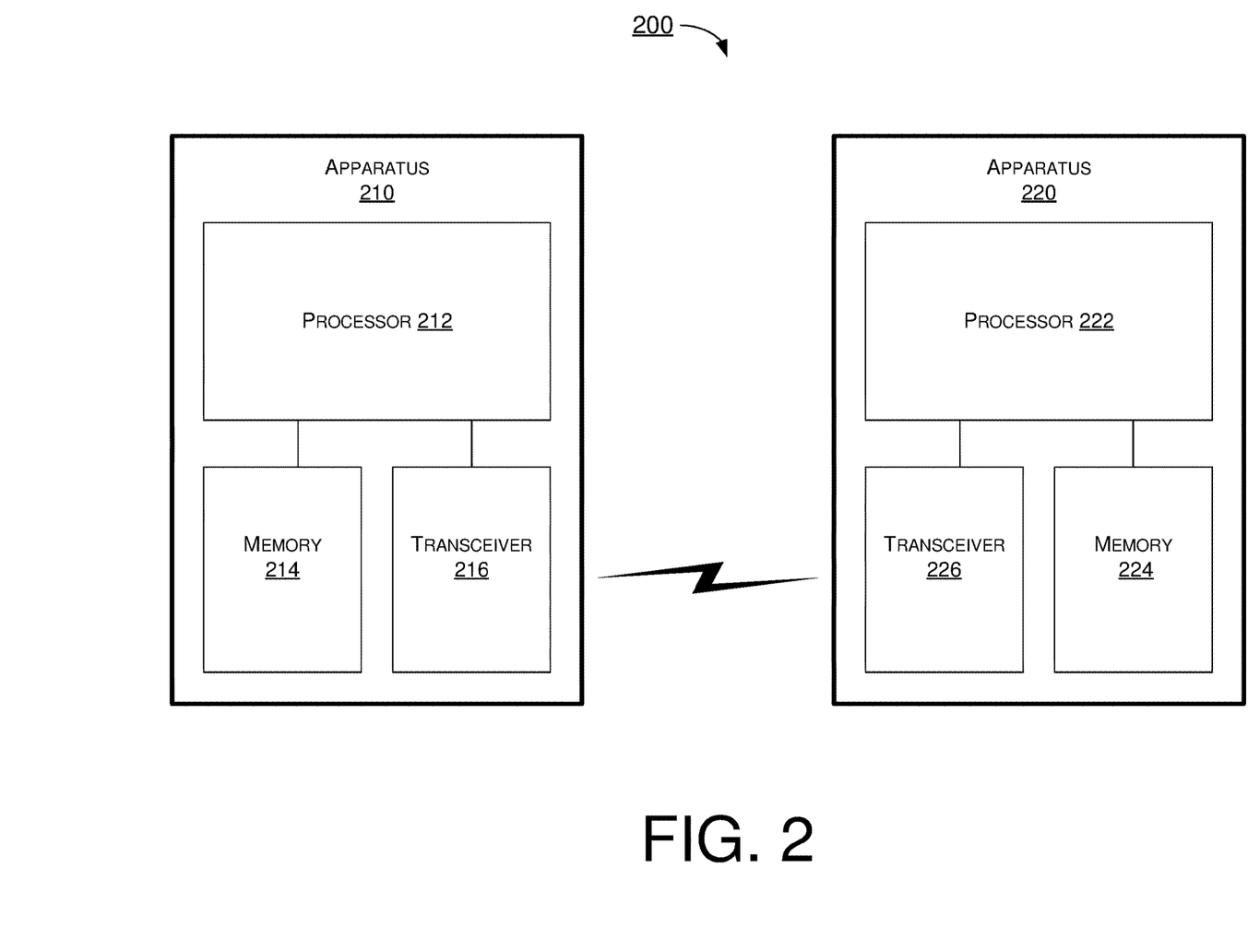
FIG. 2 is a block diagram of an example communication apparatus and an example network apparatus in accordance with an implementation of the present disclosure.

FIG. 2 illustrates an example communication environment 200 having an example apparatus 210 and an example apparatus 220 in accordance with an implementation of the present disclosure. Each of apparatus 210 and apparatus 220 may perform various functions to implement schemes, techniques, processes and methods described herein pertaining to optimization for DPP onboarding in wireless networks, including various schemes described above as well as processes 300 and 400 described below.

Each of apparatus 210 and apparatus 220 may be a part of an electronic apparatus, which may be a portable or mobile apparatus, a wearable apparatus, a wireless communication apparatus or a computing apparatus. For instance, each of apparatus 210 and apparatus 220 may be implemented in an access point (AP), a repeater, a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including implementation of optimization for DPP onboarding in wireless networks in accordance with various implementations of the present disclosure.

In some implementations, apparatus 210 may also include a transceiver 216 as a communication device coupled to processor 212 and configured to wirelessly transmit and receive data. In some implementations, apparatus 210 may further include a memory 214 coupled to processor 212 and capable of being accessed by processor 212 and storing data therein. In some implementations, apparatus 220 may also include a transceiver 226 as a communication device coupled to processor 222 and configured to wirelessly transmit and receive data. In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of apparatus 210 acting as a controller (e.g., controller 110) and apparatus 220 acting as a configured agent (e.g., configured agent 120(1)) of a wireless network (e.g., wireless network 105).

In one aspect of optimization for DPP onboarding in wireless networks, processor 212 of apparatus 210 as a controller may receive, via transceiver 216, from a smart device (e.g., smart device 130) information related to a unconfigured device (e.g., unconfigured device 140) as an enrollee not yet onboarded into the wireless network. Moreover, processor 212 may cause a plurality of configured agents (e.g., configured agents 120(1)~120(N)) in the wireless network (including apparatus 220 as configured agent 120(1)) to participate simultaneously in attempting to onboard the unconfigured device via a device provisioning protocol (DPP) mechanism responsive to receiving the information related to the unconfigured device.

In some implementations, the information related to the unconfigured device may include bootstrap information on credentials of the unconfigured device in a form of a QR code scanned by the smart device.

In some implementations, at least one of the plurality of configured agents may include an access point (AP) or a repeater.

In some implementations, in causing the plurality of configured agents to participate simultaneously in attempting to onboard the unconfigured device, processor 212 may transmit, via transceiver 216, a request to the plurality of configured agents causing the plurality of configured agents to start transmitting a DPP authentication request to the unconfigured device simultaneously.

In some implementations, the request may cause the plurality of configured agents to transmit the DPP authentication request to the unconfigured device multiple times until one of the plurality of configured agents receives a DPP authentication response from the unconfigured device.

In some implementations, the request may cause the plurality of configured agents to transmit the DPP authentication request to the unconfigured device multiple times until the controller transmits another request causing the plurality of configured agents to stop transmitting the DPP authentication request.

In some implementations, processor 212 may also perform other operations. For instance, processor 212 may receive, via transceiver 216, a DPP authentication response from the unconfigured device via at least one of the plurality of configured agents. Additionally, processor 212 may transmit, via transceiver 216, another request to the plurality of configured agents causing the plurality of configured agents to stop transmitting the DPP authentication request to the unconfigured device responsive to receiving the DPP authentication response.

In another aspect of optimization for DPP onboarding in wireless networks, processor 222 of apparatus 220 as a configured agent in a wireless network may receive, via transceiver 226, from a controller (e.g., apparatus 210 as controller 110) of the wireless network a request. Additionally, processor 222 may transmit, via transceiver 226, a device provisioning protocol (DPP) authentication request to a unconfigured device (e.g., unconfigured device 140) as an enrollee not yet onboarded into the wireless network responsive to receiving the request.

In some implementations, apparatus 220 may include an access point (AP) or a repeater.

In some implementations, the wireless network may include a multi-access point (MAP) release 2 (MAP-R2) network in accordance with a Wi-Fi Alliance specification.

In some implementations, in transmitting the DPP authentication request to the unconfigured device, processor 222 may transmit the DPP authentication request to the unconfigured device simultaneously with one or more other configured agents in the wireless network.

In some implementations, in transmitting the DPP authentication request to the unconfigured device, processor 222 may transmit the DPP authentication request to the unconfigured device multiple times until receiving a DPP authentication response from the unconfigured device.

In some implementations, in transmitting the DPP authentication request to the unconfigured device, processor 222 may transmit the DPP authentication request to the unconfigured device multiple times until receiving another request from the controller that requests the apparatus to stop transmitting the DPP authentication request.

Illustrative Processes

Figure 3:
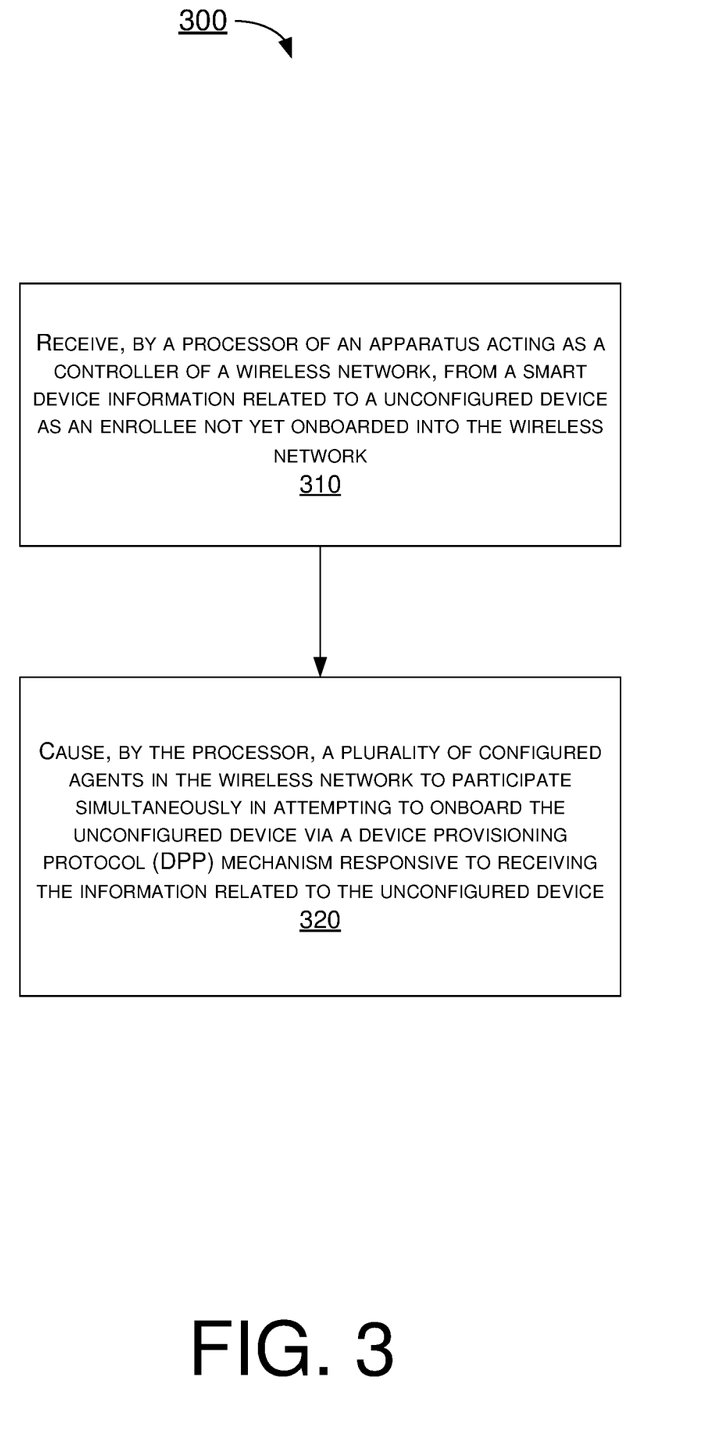
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to optimization for DPP onboarding in wireless networks in accordance with the present disclosure. Process 300 may represent an aspect of implementation of features of apparatus 210 and apparatus 220. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may also be repeated partially or entirely. Process 300 may be implemented by apparatus 210, apparatus 220 and/or any suitable wireless communication device, UE, base station or machine type devices. Solely for illustrative purposes and without limitation, process 300 is described below in the context of apparatus 210 acting as a controller (e.g., controller 110) and apparatus 220 acting as a configured agent (e.g., configured agent 120(1)) of a wireless network (e.g., wireless network 105). Process 300 may begin at block 310.

At 310, process 300 may involve processor 212 of apparatus 210 as a controller receiving, via transceiver 216, from a smart device (e.g., smart device 130) information related to a unconfigured device (e.g., unconfigured device 140) as an enrollee not yet onboarded into the wireless network. Process 300 may proceed from 310 to 320.

At 320, process 300 may involve processor 212 causing a plurality of configured agents (e.g., configured agents 120(1)~120(N)) in the wireless network (including apparatus 220 as configured agent 120(1)) to participate simultaneously in attempting to onboard the unconfigured device via a device provisioning protocol (DPP) mechanism responsive to receiving the information related to the unconfigured device.

In some implementations, the information related to the unconfigured device may include bootstrap information on credentials of the unconfigured device in a form of a QR code scanned by the smart device.

In some implementations, at least one of the plurality of configured agents may include an access point (AP) or a repeater.

In some implementations, in causing the plurality of configured agents to participate simultaneously in attempting to onboard the unconfigured device, process 300 may involve processor 212 transmitting, via transceiver 216, a request to the plurality of configured agents causing the plurality of configured agents to start transmitting a DPP authentication request to the unconfigured device simultaneously.

In some implementations, the request may cause the plurality of configured agents to transmit the DPP authentication request to the unconfigured device multiple times until one of the plurality of configured agents receives a DPP authentication response from the unconfigured device.

In some implementations, the request may cause the plurality of configured agents to transmit the DPP authentication request to the unconfigured device multiple times until the controller transmits another request causing the plurality of configured agents to stop transmitting the DPP authentication request.

In some implementations, process 300 may also involve processor 212 performing other operations. For instance, process 300 may involve processor 212 receiving, via transceiver 216, a DPP authentication response from the unconfigured device via at least one of the plurality of configured agents. Moreover, process 300 may involve processor 212 transmitting, via transceiver 216, another request to the plurality of configured agents causing the plurality of configured agents to stop transmitting the DPP authentication request to the unconfigured device responsive to receiving the DPP authentication response.

Figure 4:
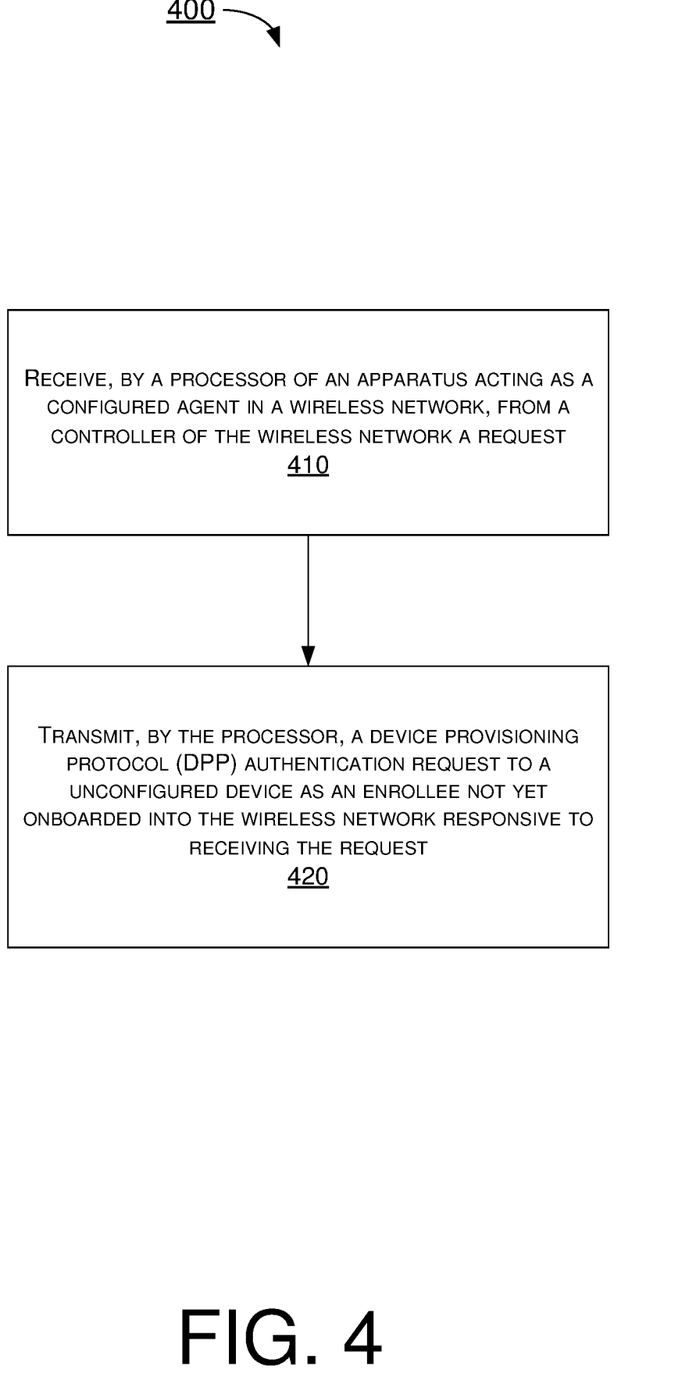
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to optimization for DPP onboarding in wireless networks in accordance with the present disclosure. Process 400 may represent an aspect of implementation of features of apparatus 210 and apparatus 220. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 210, apparatus 220 and/or any suitable wireless communication device, UE, base station or machine type devices. Solely for illustrative purposes and without limitation, process 400 is described below in the context of apparatus 210 acting as a controller (e.g., controller 110) and apparatus 220 acting as a configured agent (e.g., configured agent 120(1)) of a wireless network (e.g., wireless network 105). Process 400 may begin at block 410.

At 410, process 400 may involve processor 222 of apparatus 220 as a configured agent in a wireless network receiving, via transceiver 226, from a controller (e.g., apparatus 210 as controller 110) of the wireless network a request. Process 400 may proceed from 410 to 420.

At 420, process 400 may involve processor 222 transmitting, via transceiver 226, a device provisioning protocol (DPP) authentication request to a unconfigured device (e.g., unconfigured device 140) as an enrollee not yet onboarded into the wireless network responsive to receiving the request.

In some implementations, apparatus 220 may include an access point (AP) or a repeater.

In some implementations, the wireless network may include a multi-access point (MAP) release 2 (MAP-R2) network in accordance with a Wi-Fi Alliance specification.

In some implementations, in transmitting the DPP authentication request to the unconfigured device, process 400 may involve processor 222 transmitting the DPP authentication request to the unconfigured device simultaneously with one or more other configured agents in the wireless network.

In some implementations, in transmitting the DPP authentication request to the unconfigured device, process 400 may involve processor 222 transmitting the DPP authentication request to the unconfigured device multiple times until receiving a DPP authentication response from the unconfigured device.

In some implementations, in transmitting the DPP authentication request to the unconfigured device, process 400 may involve processor 222 transmitting the DPP authentication request to the unconfigured device multiple times until receiving another request from the controller that requests the apparatus to stop transmitting the DPP authentication request.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus acting as a controller of a wireless network, from a smart device information related to an unconfigured device as an enrollee not yet onboarded into the wireless network; and
   causing, by the processor, a plurality of configured agents in the wireless network to participate simultaneously in attempting to onboard the unconfigured device via a device provisioning protocol (DPP) mechanism responsive to receiving the information related to the unconfigured device.

2. The method of claim 1, wherein the information related to the unconfigured device comprises bootstrap information on credentials of the unconfigured device in a form of a QR code scanned by the smart device.

3. The method of claim 1, wherein at least one of the plurality of configured agents comprises an access point (AP) or a repeater.

4. The method of claim 1, wherein the causing of the plurality of configured agents to participate simultaneously in attempting to onboard the unconfigured device comprises transmitting a request to the plurality of configured agents causing the plurality of configured agents to start transmitting a DPP authentication request to the unconfigured device simultaneously.

5. The method of claim 4, wherein the request causes the plurality of configured agents to transmit the DPP authentication request to the unconfigured device multiple times until one of the plurality of configured agents receives a DPP authentication response from the unconfigured device.

6. The method of claim 4, wherein the request causes the plurality of configured agents to transmit the DPP authentication request to the unconfigured device multiple times until the controller transmits another request causing the plurality of configured agents to stop transmitting the DPP authentication request.

7. The method of claim 4, further comprising:
   receiving, by the processor, a DPP authentication response from the unconfigured device via at least one of the plurality of configured agents; and
   transmitting, by the processor, another request to the plurality of configured agents causing the plurality of configured agents to stop transmitting the DPP authentication request to the unconfigured device responsive to receiving the DPP authentication response.

8. A method, comprising:

receiving, by a processor of an apparatus acting as a configured agent in a wireless network, from a controller of the wireless network a request; and transmitting, by the processor, a device provisioning protocol (DPP) authentication request simultaneously with one or more other configured agents in the wireless network to an unconfigured device as an enrollee not yet onboarded into the wireless network responsive to receiving the request.

9. The method of claim 8, wherein the apparatus comprises an access point (AP) or a repeater.

10. The method of claim 8, wherein the transmitting of the DPP authentication request to the unconfigured device comprises transmitting the DPP authentication request to the unconfigured device multiple times until receiving a DPP authentication response from the unconfigured device.

11. The method of claim 8, wherein the transmitting of the DPP authentication request to the unconfigured device comprises transmitting the DPP authentication request to the unconfigured device multiple times until receiving another request from the controller that requests the apparatus to stop transmitting the DPP authentication request.

12. An apparatus, comprising:
a communication device configured to wirelessly communicate with a plurality of configured agents in a wireless network; and
a processor coupled to the communication device and configured to perform operations comprising:
receiving, via the communication device, from a smart device information related to an unconfigured device as an enrollee not yet onboarded into the wireless network; and
causing the plurality of configured agents in the wireless network to participate simultaneously in attempting to onboard the unconfigured device via a device provisioning protocol (DPP) mechanism responsive to receiving the information related to the unconfigured device.

13. The apparatus of claim 12, wherein the information related to the unconfigured device comprises bootstrap information on credentials of the unconfigured device in a form of a QR code scanned by the smart device.

14. The apparatus of claim 12, wherein at least one of the plurality of configured agents comprises an access point (AP) or a repeater.

15. The apparatus of claim 12, wherein, in causing the plurality of configured agents to participate simultaneously in attempting to onboard the unconfigured device, the processor is configured to transmit, via the communication device, a request to the plurality of configured agents causing the plurality of configured agents to start transmitting a DPP authentication request to the unconfigured device simultaneously.

16. The apparatus of claim 15, wherein the request causes the plurality of configured agents to transmit the DPP authentication request to the unconfigured device multiple times until one of the plurality of configured agents receives a DPP authentication response from the unconfigured device.

17. The apparatus of claim 15, wherein the request causes the plurality of configured agents to transmit the DPP authentication request to the unconfigured device multiple times until the controller transmits another request causing the plurality of configured agents to stop transmitting the DPP authentication request.

18. The apparatus of claim 15, wherein the processor is further configured to perform operations comprising:
receiving, via the communication device, a DPP authentication response from the unconfigured device via at least one of the plurality of configured agents; and
transmitting, via the communication device, another request to the plurality of configured agents causing the plurality of configured agents to stop transmitting the DPP authentication request to the unconfigured device responsive to receiving the DPP authentication response.

* * * * *